United States Patent Office 2,970,925
Patented Feb. 7, 1961

2,970,925
METHOD OF MANUFACTURING A CEMENT CLINKER

Klaus Dyckerhoff, Duisburg, Germany
(Kaiserstrasse 42, Rheinhausen, Rhineland, Germany)

No Drawing. Filed Sept. 18, 1958, Ser. No. 761,670

2 Claims. (Cl. 106—100)

The present invention relates to the manufacture of a cement clinker, and in particular to a cement clinker, the raw ingredients of which, consisting substantially of limestone ($CaCO_3$) or marl and silicon dioxide ($SiO_2$), are finely ground, admixed and then burned at a temperature range of about 1400° C. to 1450° C., whereby substantially a new constitution of of the mineral to calcium silicates, calcium aluminates and calcium-aluminate ferrites is brought about.

This is a continuation-in-part application of the application Serial No. 707,139 filed January 6, 1958 (now abandoned).

The present invention is based on the fact that for the production of a clinker of Portland cement with the known working and burning processes, a predetermined melting portion must be present, in order to achieve a sufficiently fast reaction among the solid raw components during the conventional burning temperature range. The melting portion is achieved by so-called melting means which melt eutectically at the mentioned temperature range. This melting portion remains, however, upon cooling of the burned material mainly as calcium aluminate and calcium aluminate ferrite, which are not suitable for certain uses of the cement. Thus, for instance, cement, which is rich in calcium aluminates, is unstable when subjected to sulfate-containing water. Cement, which is rich in calcium aluminates, shows low rigidity upon setting. Correspondingly, in a known manner, cement which is aggressively constant, is burned with a melting means which is poor in $A_2O_3$ and rich in $Fe_2O_3$, while cement of high rigidity and light color, respectively, is burned with a melting means which is poor in $Fe_2O_3$ and rich in $Al_2O_3$. Yet, for the white cement, always more in demand more recently, a greater proportion of the melting means is required for the purpose of a "complete reaction" of the clinker, which melting means has, by elimination of iron containing components, a high content of aluminates or components which form other eutectic melts.

The necessary presence of a greater proportion of melt components in the cement clinker causes thus always an appreciable deterioration of several characteristics, which include partly the rigidity, setting time, setting heat and shrinkage of the cement mortar.

Attempts have been made, therefore, to forego the proportion of melting means in the cement clinker partly or even entirely. These attempts brought about the result, however, that a cement clinker without melting means does not lead to a "complete reaction" at the conventional burning temperature range of about 1400° C. to 1450° C. Rather, extremely higher temperatures are required for a sufficiently fast reaction among the components of the material, which rendered the process, however, completely uneconomical.

It is, therefore, one object of the present invention, to provide a method of manufacturing a cement clinker which avoids the drawbacks and difficulties of the known methods, and to develop a cement clinker which, depending upon the requirements, does not contain practically any melting means components and consists nearly exclusively of calcium silicates.

This end is achieved in accordance with the present invention by admixing to the limestone or marl, which is poor in melting means during the preparation of the mixture of the raw components an ingredient of disintegrated quartz which is finer than $50\mu$.

This method of the present invention has, at first, the advantage that the highly dispersed quartz particles react with the limestone particles with an intensity completely sufficient for a "complete reaction" by application of the technically conventional burning temperatures of about 1400° C. to 1450° C. and burning periods. The present invention leads further to the notion that during a very large surface engagement between the limestone component and the quartz a practically new mineral constitution to the desired calcium silicates takes place, which does not necessitate melting means as initiator for the reaction.

In accordance with the present invention, this reaction effect is further enhanced by grinding the quartz separately to a fineness of finer than $30\mu$ prior to its admixture to limestone or marl. The raw ingredients may be from the outset limestone ($CaCO_3$) and quartz ($SiO_2$) or in case of a marl with a portion of coarser quartz. This separation may be performed by means of sorting in a pulverization device.

Crystalline quartz is particularly suitable for the process, since its grid transformations favor the reaction with limestone during the heating period. In an advantageous manner not only quartz sand, but also quartzite and gravel may be used.

The present invention is not limited to mixtures of raw material, the components of which have their origin from nearly pure limestone and quartz deposits, but marl-like deposits of raw material with a low or no content of $Al_2O_3$ and $Fe_2O_3$ may be burned to clinkers which are technically free from objections. More or less highly dispersed quartz is added to this finely ground marl-like limestone component, depending upon its composition.

*Example 1*

In a cement plant a highly valued limestone and a good quartz sand of the following composition is available:

Limestone: | Percent by weight
--- | ---
$CaCO_3$ | 97.00
$SiO_2$ | 2.32
$Al_2O_3$ | 0.48
$Fe_2O_3$ | 0.20
Quartz sand: |
$SiO_2$ | 95.70
$Al_2O_3$ | 2.60
$Fe_2O_3$ | 1.70

At first both raw ingredients are broken up in breakers and grinding mills. The limestone is to be finely ground to a degree so that about 90 parts by weight are finer than $90\mu$. On the other hand, the quartz sand is ground in a fine grinding mill finer than $30\mu$. The fine grinding mill is formed advantageously as a circulation mill, in which the portion ground finer than $30\mu$ is separated in a sorter and the coarser portion is returned to the fine grinding mill. It is to be understood, however, that other known grinding systems are suitable for the break-up of the quartz sand.

The two broken-up raw components are now admixed in a mixer, for instance, with such preparations, that a silica modulus of 12.75 is achieved for the clinker. A calculation disclosed that 161 parts in weight of quartz flour are to be added to 1000 parts in weight of limestone.

The mixing of the raw ingredients may take place, for instance, in conventional mixers, as mixing arms, in vats, mixing worms, mixing drums, etc. in dry or wet condition. It is possible, however, to add the finely ground quartz flour from the finely grinding mill to the limestone, so that by simultaneous finely grinding of the limestone, an intensive admixing of the latter with the quartz flour is brought about.

Then granulated material is formed in known manner from the mixed raw material, which granulated material is completely burned in a rotary-furnace or in a pit-furnace to cement clinkers at a temperature of, for instance, 1450° C. At said temperature the clinker will have only about 5.50% of a melting portion. The reaction of the raw ingredients has to take place thus substantially in their solid state, which reaction is very much accelerated by the fineness of the quartz particles.

The cooled cement clinker has about the following chemical composition in percentage by weight:

| Cement clinker: | Percent by weight |
|---|---|
| CaO | 72.50 |
| $SiO_2$ | 25.50 |
| $Al_2O_3$ | 1.30 |
| $Fe_2O_3$ | 0.70 |

The simply calculated mineral composition (in accordance to Bogue) leads to the following values:

| | Percent by weight |
|---|---|
| Tri-calcium-silicate | 91.10 |
| Bi-calcium-silicate | 4.60 |
| Calcium-aluminate | 2.20 |
| Calcium-aluminate-ferrite | 2.10 |

These values disclose that merely a proportion of 4.30% of calcium-aluminates and calcium-aluminate-ferrites is to be expected in the burned cement clinker, in that their influence on the characteristics of the finely ground cement is extremely low.

*Example II*

In a cement plant chalk or lime marl and sand or quartzite of the following composition is available as raw material:

| Chalk or lime marl: | Percent by weight |
|---|---|
| $CaCO_3$ | 88.33 |
| $SiO_2$ | 11.55 |
| $Al_2O_3$ | 0.06 |
| $Fe_2O_3$ | 0.06 |
| Sand or quartzite: | |
| $CaCO_3$ | 13.76 |
| $SiO_2$ | 83.16 |
| $Al_2O_3$ | 2.05 |
| $Fe_2O_3$ | 1.03 |

From this raw material a cement clinker with a very high content of tri-calcium-silicate is made, whereby for the melting means portion a silica modulus of 52.6 is set.

The chalk, which is available in the plant as a raw material, is, for instance, wet ground. The sand, on the other hand, can be ground, either dry or wet to a degree which is finer than 30µ. In a plant where lime marl is available as a raw material, the lime marl is advantageously broken up in a circulation grinding mill and the finely broken up quartzite is then admixed thereto.

In both instances merely a melting portion of about 1.32% by weight will result at a burning temperature of 1450° C. The clinker will have the following chemical compositions:

| Cement clinker: | Percent by weight |
|---|---|
| CaO | 73.20 |
| $SiO_2$ | 26.30 |
| $Al_2O_3$ | 0.30 |
| $Fe_2O_3$ | 0.20 |

The following mineral composition of the clinker results:

| | Percent by weight |
|---|---|
| Tri-calcium-silicate | 95.8 |
| Bi-calcium-silicate | 3.2 |
| Calcium-aluminate | 0.4 |
| Calcium-aluminate-ferrite | 0.6 |

Thus only about 1% by weight of calcium-aluminates and calcium-aluminate-ferrites will be contained in the cement.

*Example III*

In a cement plant lime marl is available which could not be processed with the known methods without addition of flowing means.

Its composition is as follows:

| Lime marl: | Percent by weight |
|---|---|
| $CaCO_3$ | 84.00 |
| $SiO_2$ | 15.10 |
| $Al_2O_3$ | 0.18 |
| $Fe_2O_3$ | 0.12 |

This composition of the raw material corresponds already with the desired conditions, since the silicate module amounts already to 52.6.

In this case it is thus merely necessary that the quartz and sand portion, respectively, present in the lime marl, is ground to a fineness of finer than 50µ required for the reaction during burning. This can be brought about in accordance with the present invention, by either subjecting the total raw mixture to this fineness or by separating the quartz proportion from the lime by sorting, sedimentation, washing or the like, to subject said quartz to the mentioned fineness and then again admixed to the lime. This raw material leads to a cement clinker, the composition of which is substantially identical with that disclosed in Example II.

While I have disclosed several embodiments of the present invention, it is to be understood that these embodiments are given by example only and not in a limiting sense, the scope of the present invention being determined by the objects and the claims.

I claim:

1. A method of manufacturing cement clinker poor in relatively low melting components and comprising a major amount of tri-calcium silicate consisting of the steps of first finely grinding silicon dioxide ($SiO_2$) to a fineness of less than 30µ, then admixing ground calcium carbonate to said silicon dioxide in a proportion to arrive at a silica modulus of more than 5.0, said fine grinding taking place prior to said admixing step, and burning said mixture at a temperature range of 1400° C. to 1450° C.

2. The method, as set forth in claim 1, wherein said silicon dioxide is a crystalline quartz selected from the group consisting of sand, quartzite and gravel.

References Cited in the file of this patent

UNITED STATES PATENTS

| 1,184,656 | Newhouse | May 23, 1916 |
| 2,006,939 | Breerwood | July 2, 1935 |
| 2,021,623 | Breerwood | Nov. 19, 1935 |
| 2,083,179 | Work | June 8, 1937 |

FOREIGN PATENTS

| 345,103 | Great Britain | Mar. 26, 1931 |